United States Patent [19]

Hamada

[11] Patent Number: 4,495,653
[45] Date of Patent: Jan. 22, 1985

[54] DIVERSITY RECEIVER

[75] Inventor: Masanori Hamada, Tokyo, Japan

[73] Assignee: Clarion Co., Ltd., Tokyo, Japan

[21] Appl. No.: 488,293

[22] Filed: Apr. 25, 1983

[30] Foreign Application Priority Data

Apr. 30, 1982 [JP] Japan .................................. 57-73840

[51] Int. Cl.³ .......................... H04B 1/16; H04B 7/08
[52] U.S. Cl. .................................... 455/277; 455/345
[58] Field of Search .............. 455/133, 134, 140, 277, 455/272, 278, 345

[56] References Cited

U.S. PATENT DOCUMENTS 4,403,343 9/1983 Hamada .............................. 455/277

FOREIGN PATENT DOCUMENTS 2514181 9/1975 Fed. Rep. of Germany ...... 455/277
2827572 12/1979 Fed. Rep. of Germany ...... 455/277
115739 9/1980 Japan ................................... 455/277

Primary Examiner—Jin F. Ng
Attorney, Agent, or Firm—Flynn, Thiel, Boutell & Tanis

[57] ABSTRACT

The diversity receiver including plural antennas and one receiver comprises a detector means to detect a signal voltage responsive to an antenna output from an IF amplifier of the receiver and a comparator which is supplied with the signal voltage separated in two courses, one including a fixed bias applying circuit and the other including a time constant circuit, so as to select one of the antennas which is in a good receiving condition.

1 Claim, 8 Drawing Figures

DIVERSITY RECEIVER

BACKGROUND OF THE INVENTION

1. Field of the Invention

This invention relates to a diversity receiver including plural antennas and one receiver so as to switch the antennas in response to their receiving conditions, and thereby suited for use in a car.

2. Description of the Prior Art

An FM receiver mounted in a car or other moving bodies is usually used while the body moves. Therefore, the direction of its antenna always largely changes as compared to a house-use FM receiver, and is apt to disaccord with directions of antennas of broadcasting stations. As the result, it is difficult to block influences by multipath noises.

The receiver of this type is mostly used in a weak electric field because electric field strength for the receiver always varies as the car goes on from highways to mountainous places, or from valleys to valleys between tall buildings. Due to this, the receiver must deal with noises intermittently generated within the receiver itself during reception of weak input signals.

One of conventional methods to overcome the above-mentioned problem is to change the receiver from stereophonic mode to monoral mode upon reception of weak input signals, or to attenuate high frequency band wave in addition to the foregoing mode changeover. By this method, however, since S/N (signal-to-noise ratio) improvement is done within the receiver to the input signal received by a single antenna, there is accordingly a limit in said improvement.

Another method is to provide two antennas and two tuners, thereby constructing a so-called diversity receiver so as to switch and select the antennas and the tuners in response to the receiving conditions. Although this method is more effective in said S/N improvement than the foregoing method, provision of two tuners causes increase of production cost and space.

OBJECT OF THE INVENTION

It is therefore an object of the present invention to overcome the above-mentioned drawbacks involved in the prior art, and to provide a diversity receiver including plural antennas and a single receiver and capable of maintaining always good receiving condition of the receiver.

SUMMARY OF THE INVENTION

In accordance with the present invention, a signal voltage responsive to an input signal received by one of plural antennas and detected by a single receiver is separated into two routes for comparison of the separated voltages so that, the antennas are switched in response to the result of the comparison, and one of them which is in a good receiving condition is always selected.

DETAILED DESCRIPTION OF THE PREFERRED EMBODIMENTS

Figure 1:
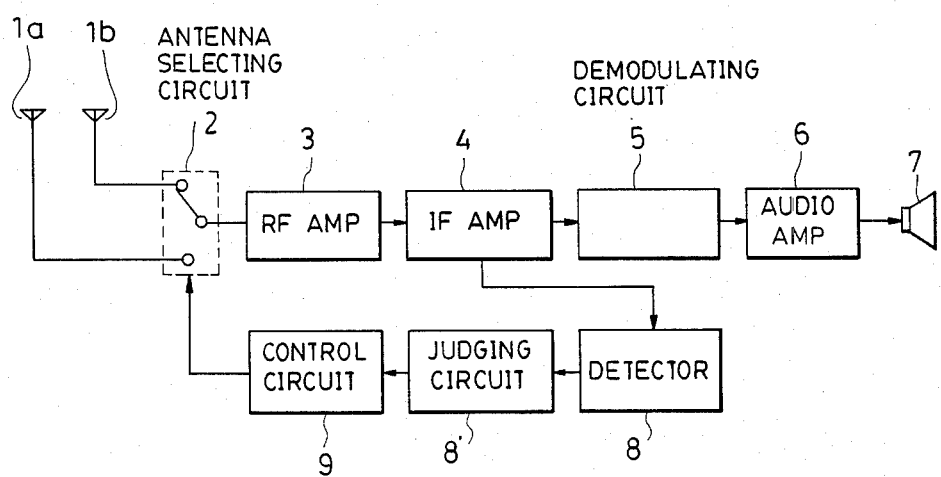
FIG. 1 is a block diagram showing an embodiment according to the present invention.

The present invention will now be described in detail by way of preferred embodiments referring to the drawings.

FIG. 1 is a block diagram of an embodiment of the diversity receiver according to this invention. Reference numerals $1a$ and $1b$ refer to antennas, 2 to an antenna selecting circuit, 3 to an RF amplifier, 4 to an IF amplifier, 5 to a demodulating circuit, 6 to an audio amplifier, 7 to a speaker, 8 to a detector, 8' to a judging circuit, and 9 to a control circuit, respectively. The detector 8 detects, from IF signals of the IF amplifier 4, a signal voltage responsive to an output of the antenna $1a$ or $1b$. The judging circuit 8' detects, from the signal voltage, a dc voltage proportional to the electric field of a signal received by the antenna $1a$ or $1b$, or detects a dc voltage obtained by comparison and computation of the electric field and the multipath level, and judges whether the receiving condition is good or not. The control circuit 9 makes the antenna selecting circuit excute or withhold its antenna switching action in response to a signal voltage from the judging circuit 8' so that the receiver is always connected to one of the antennas in a good receiving condition.

Figure 2:
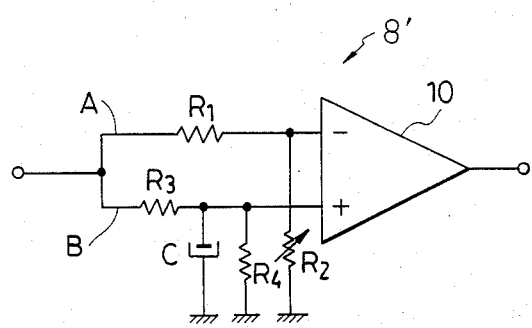
FIG. 2 is a circuit diagram of the judging circuit.

FIG. 2 shows the judging circuit 8' which performs comparison and computation of the detection voltage detected by the detector 8 and generates a resultant output to actuate the control circuit 9. The detection voltage is separated into two courses (paths), namely, course A including a resistor $R_1$ and a variable resistor $R_2$, and course B including a time constant circuit consisting of resistors $R_3$, $R_4$ and a capacitor C. The separated voltages are applied to a (−) terminal and a (+) terminal of the comparator, respectively, for comparison and computation thereby. In this case, while the (+) terminal is applied with the separated voltage after voltage division by the resistors $R_1$ and $R_2$, the (−) terminal is applied with the separated voltage after voltage division by the resistors $R_3$ and $R_4$. However, since the charging/discharging capacitor C is included in the course B, the separated voltage to the (−) terminal is affected by the time constant circuit. The (+) terminal is designed to normally receive a lower separated voltage than that to the (−) terminal.

Figure 3:
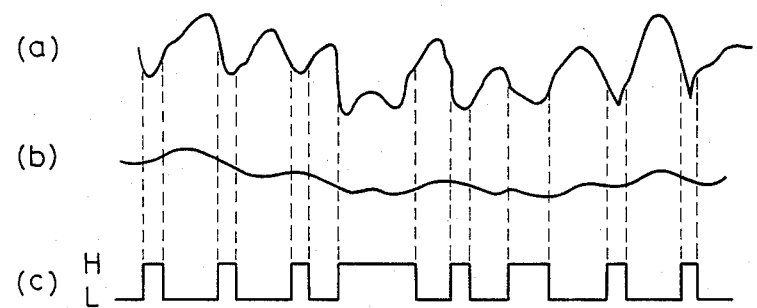
FIG. 3 shows waveforms.

When the car runs carrying the receiver including said comparator 10 for a certain distance, output voltages with waveforms as shown by (a), (b) and (c) in FIG. 3 are obtained from the respective terminals of the comparator 10. The waveform (a) corresponds to the separated output voltage applied to the (−) terminal via the route A and shows that this voltage varies in accordance with change of receiving condition. The waveform (b) corresponds to the separated output voltage applied to the (+) terminal via the route B, and shows that variation of this voltage is moderated due to the time constant circuit with combination of the resistor $R_3$ and the capacitor C or with the combination of the resistor $R_4$ and the capacitor C. The waveform (c) corresponds to the output supplied from the comparator 10 as the result of comparison and computation of the both separated voltages shown by the waveforms (a) and (b). The comparator 10 supplies an H (high level) signal, for example, when the detector voltage lowers down the average level due to electric field variation caused by a bad receiving condition, and supplies an L (low level) signal when the detector voltage becomes higher than the average level, thereby allowing judgement that the receiving condition is good when the L signal is supplied, and bad when the H signal is supplied.

The output signal from the comparator 10 is applied to the control circuit 9. The control circuit 9 is operative only when the comparator 10 supplies the H level signal (when the receiving condition is bad) so as to actuate the antenna switching circuit 2.

Figure 4:
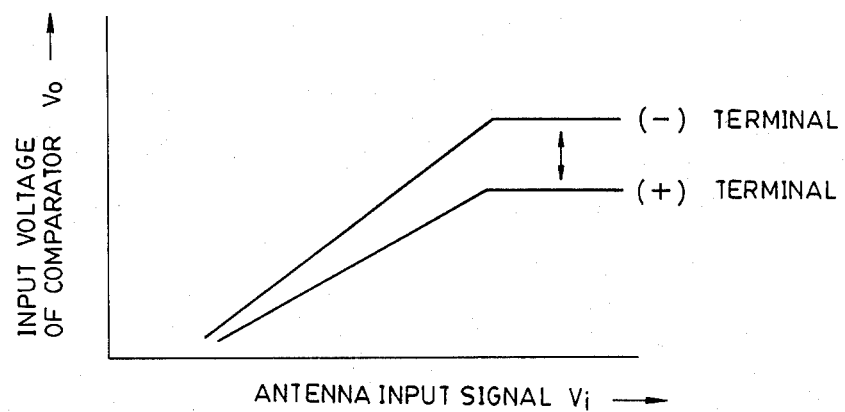
FIG. 4 shows properties of the voltages to the (−) and (+) terminals of the comparator in the judging circuit of FIG. 2.

FIG. 4 shows properties of the input voltages Vi at the (−) and (+) terminals of the comparator 10 (ordinate) with respect to the antenna input signal Vo (abscissa).

By adjusting the variable resistor $R_2$ provided in the course A, the (−) terminal voltage may be increased or decreased as shown by the two head arrow in FIG. 4. This property teaches that antenna selection sensitivity is extremely good when the antenna input Vi is weak, and is bad when the antenna input Vi is sufficiently strong (changeover of the antennas is not effected unless the electric field strength extremely lowers).

Figure 5:
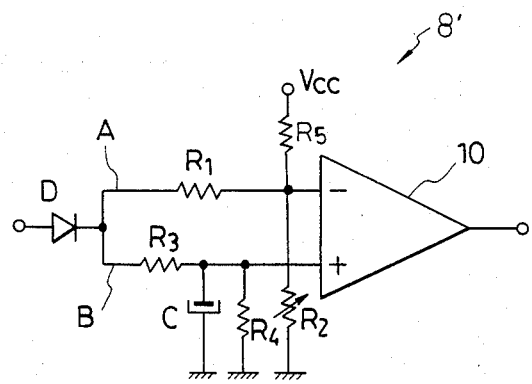
FIG. 5 is a further circuit diagram of the judging circuit.

FIG. 5 shows another construction of the judging circuit 8'. D is a diode and $R_5$ is a resistor connected in series to the variable resistor $R_2$ to supply the (−) terminal with a forward fixed bias derived from a source voltage VCC. The diode D performs dc blocking and voltage level shifting of the signal from the detector 8.

Figure 6:
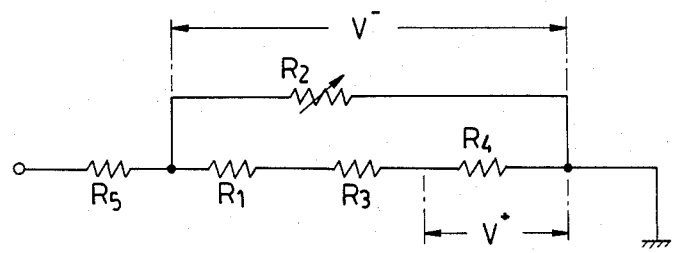
FIG. 6 is an equivalent circuit diagram.

With this arrangement of the judging circuit 8', if the input impedance of the judging circuit 8' is sufficiently high upon reception of a weak input, its equivalent circuit is shown by FIG. 6, and the voltages $V^-$ and $V^+$ at the (−) and (+) terminals of the comparator 10 are expressed by the following equations:

$$V^- = \frac{R_2(R_1 + R_3 + R_4)}{R_1 + R_3 + R_4 + R_2} / R_5 + \frac{R_2(R_1 + R_3 + R_4)}{R_1 + R_3 + R_4 + R_2}$$

$$V^+ = V^- \frac{R_4}{R_1 + R_3 + R_4}$$

Figure 7:
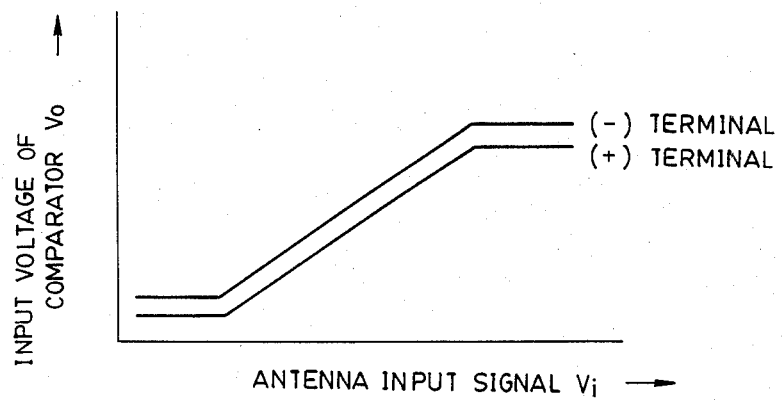
FIGS. 7 and 8 show modified voltage properties.

FIG. 7 shows properties of the voltages at the respective terminals of the comparator 10 in the judging circuit 8' with respect to the antenna input signal. By supplying the (−) terminal of the comparator 10 with a forward fixed bias as described in the above, antenna selection sensitivity especially upon weak input reception can be lowered as compared to the property of FIG. 4. Due to this, since the antenna changeover is not effected even if the electric field strength varies more or less, too frequent antenna switching actions are prevented while the car passes through a weak signal region such as tunnel, for example.

Figure 8:
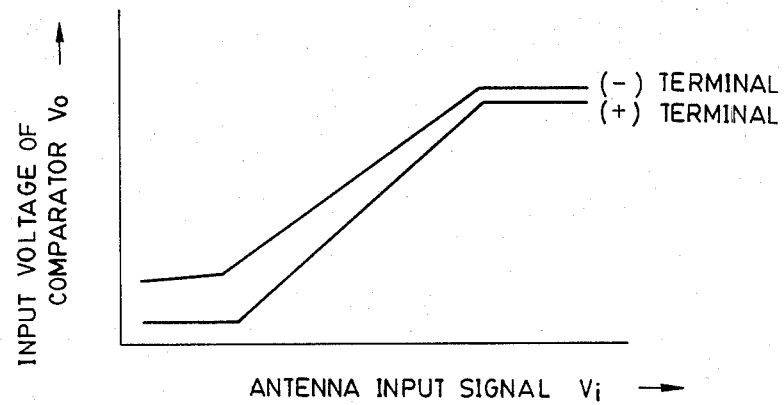

FIG. 8 shows still further properties of the voltages at the (−) and (+) terminals of the comparator 10. The comparator input voltages can be shifted by use of forward voltage drop of the diode D provided at the input end of the judging circuit 8'. The variation properties can be modified by increasing and adjusting the number of the diodes D. This Figure shows that the antenna switching sensitivity is dull upon weak input reception but sharp upon sufficient increase of the input.

Whichever point the antenna switching action is effected or not can be selected as desired by adjustment of the variable resistor $R_2$.

When the resistance of the resistor $R_5$ is larger than those of the other resistors so as to supply the (−) terminal of the comparator 10 with a slight forward fixed bias, it is effective in performance of its purpose.

As described in the above, the receiver of this invention, including plural antennas and one receiver and designed to separate a signal voltage detected by the receiver into two courses to compare the separated voltages so as to switch the antennas in response to the output resulted from the comparison, effectively reduces multipath noises and improves S/N ratio with only one receiver, thereby leading to reduction of production cost and space of the diversity receiver.

Especially when a fixed bias applying circuit is provided in one of the two courses, the output as the result of the comparison responsive to the input to the receiver can be freely determined so as to prevent too frequent changeover between the antennas, thereby reducing noises caused by the changeover. Further, the separated voltages can be adjusted so as to sharpen the antenna switching sensitivity when the input is sufficiently large.

I claim:

1. A diversity receiver which comprises:
   a plurality of antennas;
   an antenna selecting means to which said antennas are connected;
   a receiver to which an antenna output from said antenna selecting means is applied;
   a detector means to detect a signal voltage responsive to said antenna output from the output of an intermediate frequency amplifier of said receiver;
   a judging means responsive to said signal voltage from said detector means to generate a judgement signal indicating whether receiving condition of operating one of the antennas is good or not;
   a control means responsive to said judgement signal from said judging means to actuate said antenna selecting means so as to select one of said antennas which is in a good receiving condition;
   said judging means including a comparator and two paths connecting two input terminals of said comparator to said detector means for comparing two inputs applied to said input terminals, one of said paths including a time constant circuit and the other including a bias applying means, at least one diode being connected between said detecting means and said two paths of the judging means.

* * * * *